US012606702B2

(12) United States Patent
Gu et al.

(10) Patent No.: US 12,606,702 B2
(45) Date of Patent: Apr. 21, 2026

(54) POLYCARBONATE COMPOSITIONS

(71) Applicant: Covestro Deutschland AG, Leverkusen (DE)

(72) Inventors: Jianfeng Gu, Shanghai (CN); Xiaoxiang Wang, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 883 days.

(21) Appl. No.: 17/793,958

(22) PCT Filed: Jan. 15, 2021

(86) PCT No.: PCT/EP2021/050821

§ 371 (c)(1),
(2) Date: Jul. 20, 2022

(87) PCT Pub. No.: WO2021/148325

PCT Pub. Date: Jul. 29, 2021

(65) Prior Publication Data

US 2023/0043053 A1 Feb. 9, 2023

(30) Foreign Application Priority Data

Jan. 23, 2020 (WO) ................ PCT/CN2020/073994
Mar. 9, 2020 (EP) .................................... 20161696

(51) Int. Cl.
*C08L 69/00* (2006.01)

(52) U.S. Cl.
CPC .................................... *C08L 69/00* (2013.01)

(58) Field of Classification Search
CPC .......... C08L 69/00; C08L 23/26; C08L 91/06; C08K 3/013
See application file for complete search history.

(56) References Cited

U.S. PATENT DOCUMENTS

| | | | | |
|---|---|---|---|---|
| 2002/0107329 | A1* | 8/2002 | Ding | C08L 23/10 525/196 |
| 2016/0160044 | A1 | 6/2016 | Kanaya et al. | |
| 2017/0355817 | A1 | 12/2017 | Wehrmann et al. | |

FOREIGN PATENT DOCUMENTS

| | | | | | |
|---|---|---|---|---|---|
| CN | 108276742 | A | * | 7/2018 | |
| CN | 110128809 | A | * | 8/2019 | C08L 69/00 |
| CN | 110804296 | A | | 2/2020 | |
| EP | 3015510 | A1 | | 5/2016 | |
| KR | 101735653 | B1 | * | 5/2017 | C08K 5/09 |
| WO | 9606135 | A1 | | 2/1996 | |

OTHER PUBLICATIONS

Euroceras Ceralene(R) Waxes Data Sheet 2012 (Year: 2012).*

* cited by examiner

*Primary Examiner* — Marc S Zimmer
*Assistant Examiner* — Surbhi M Du
(74) *Attorney, Agent, or Firm* — Richard P. Bender; John E. Mrozinski, Jr.

(57) ABSTRACT

The present invention relates to polycarbonate compositions and molded articles made therefrom. The polycarbonate composition comprises: A) 70-95 wt. % of aromatic polycarbonate, B) 4-26 wt. % of mineral fdler, C) 0.1-4 wt. % of ester-modified wax, D) 0.1-0.6 wt. % of a mold release agent, E) 0.05-0.3 wt. % of antioxidant, F) 0-0.3 wt. % of neutralizer, and G) 0-2 wt. % of coloring agent, wherein the amount of each component is based on the total weight of the polycarbonate composition. The molded articles made from the polycarbonate composition according to this invention show enhanced impact strength, tensile elongation at break and surface gloss.

12 Claims, No Drawings

POLYCARBONATE COMPOSITIONS

CROSS-REFERENCE TO RELATED APPLICATIONS

This application is a national stage application (under 35 U.S.C. § 371) of PCT/EP2021/050821, filed Jan. 15, 2021, which claims benefit of Chinese Application No. PCT/CN2020/073994, filed Jan. 23, 2020, and European Application No. 20161696.8, filed Mar. 9, 2020, all of which are incorporated herein by reference in their entirety.

The present invention relates to polycarbonate compositions. Furthermore, the present invention relates to molded articles made from such polycarbonate compositions, such as housings or parts of housings of electric and electronic devices, consumer appliances and automobile parts, in particular thin wall parts.

Reinforced aromatic polycarbonate compositions usually have high modulus and accordingly they have been used in various applications in a wide range of industries, such as being used for making housings of electric and electronic devices and consumer appliances, as well as automobile parts.

Reinforced aromatic polycarbonate compositions usually include mineral fillers with small particle sizes and needle or platy shape, such as wollastonite, mica, kaolin and talc, etc. for improved modulus and also for economic benefits, that is, higher property-cost ratio. However, the addition of mineral fillers reduces the impact strength of the polycarbonate compositions. It also decreases the flowability and results in negative influences on the surface gloss of the molded articles prepared with the polycarbonate compositions.

Therefore, in developing polycarbonate compositions, how to achieve simultaneously high modulus, high impact strength, tensile elongation at break and good surface gloss is a big technical challenge.

The existing solution to enhance the impact strength of polycarbonate compositions is to add impact modifiers, in particular rubber-type impact modifiers, such as acrylonitrile butadiene styrene copolymers (ABS), methyl methacrylate-butadiene-styrene (MBS), acrylic rubber, silicone based rubber, and ethylene copolymers, etc. However, the addition of such impact modifiers into the mineral filler reinforced polycarbonate compositions usually leads to limited improvement in impact strength but with more negative influence, such as decreased flowability, enlarged mold shrinkage and coefficient of linear thermal expansion (CLTE). It also decreases flame retardant performance if the impact modifier is a non-silicone based rubber. If the application is intended for housing of electric and electronic devices, consumer appliances and automobile parts, in particular thin wall parts, this problem would be more serious.

U.S. Pat. No. 8,871,858 B2 discloses a thermoplastic composition comprising an aromatic polycarbonate, an impact modifier, an aromatic vinyl copolymer, a mineral filler, and an organo-hydrosiloxane or a copolymer comprising an organo-hydrosiloxane and a polysiloxane.

U.S. Pat. No. 8,883,878 B2 discloses a thermoplastic composition comprising an aromatic polycarbonate, an impact modifier, an aromatic vinyl copolymer, a mineral filler, and a titanium dioxide, wherein the titanium dioxide is coated with silicone or siloxane.

US 2012/0245262 A1 discloses a polymeric composition comprising a polycarbonate polymer, a mineral filler, and a sulfonate salt. The used sulfonate salts include sodium alkylsulfonate (SAS) and sodium dodecylbezene sulfonate (SDBS), and the result polymeric composition has improved Izod notched impact strength.

The industry needs to have an alternative polycarbonate composition, which can be used to produce an article having enhanced impact strength, tensile elongation at break and good surface gloss for the applications, such as housings or parts of housings of electric and electronic devices, consumer appliances and automobile parts, in particular thin wall parts.

Thus, one object of the present application is to provide a polycarbonate composition, which can be used to produce an article having enhanced impact strength, tensile elongation at break and good surface gloss.

Another object of the present application is to provide an article having enhanced impact strength, tensile elongation at break and good surface gloss.

Therefore, according to a first aspect, the present invention provides a polycarbonate composition comprising the following components:

A) 70-95 wt. % of aromatic polycarbonate,
B) 4-26 wt. % of mineral filler,
C) 0.1-4 wt. % of ester-modified wax,
D) 0.1-0.6 wt. % of mold release agent,
E) 0.05-0.3 wt. % of antioxidant,
F) 0-0.3 wt. % of neutralizer, and
G) 0-2 wt. % of coloring agent, wherein the amount of each component is based on the total weight of the polycarbonate composition, and the ester-modified wax has the following formula (W1):

(W1)

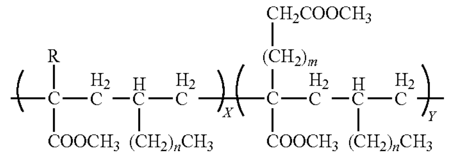

wherein

R is hydrogen or a $C_1$- to $C_5$-alkyl group, preferably hydrogen or a methyl group, n represents an integer of 20 to 40, m represents an integer of 1 to 5, preferably 1, and X and Y, independently of one another, represent an integer of 3 to 1000.

According to a second aspect, the present invention provides a process for preparing the polycarbonate composition according to the first aspect of the present invention, comprising the step of blending components A, B, C, D, E, and optional components F and G.

According to a third aspect, the present invention provides a molded article made from the polycarbonate composition according to the first aspect of the present invention, such as housings or parts of housings of electric and electronic devices, consumer appliances and automobile parts, for example, housings of laptops.

According to a fourth aspect, the present invention provides a method for preparing the molded article according to the third aspect of the present invention, comprising injection moulding, extrusion moulding, blowing moulding or thermoforming the polycarbonate composition according to the first aspect of the present invention.

An article made from the polycarbonate composition according to the present invention has enhanced impact strength, tensile elongation at break and good surface gloss, can be used for the application such as housings of electric and electronic devices, consumer appliances and automobile parts.

Other subjects and characteristics, aspects and advantages of the present invention will emerge even more clearly on reading the description and the examples that follows.

In that which follows and unless otherwise indicated, the limits of a range of values are included within this range, in particular in the expressions "between . . . and . . . " and "ranging from . . . to . . . ". Throughout the instant application, the term "comprising" is to be interpreted as encompassing all specifically mentioned features as well optional, additional, unspecified ones.

Unless defined otherwise, all technical and scientific terms used herein have the same meaning as commonly understood by one of ordinary skill in the art to which the present invention pertains.

When the definition of a term in the present description conflicts with the meaning as commonly understood by those skilled in the art the present invention belongs to, the definition described herein shall apply.

Unless otherwise specified, all numerical values expressing amount of ingredients and the like which are used in the description and claims are to be understood as being modified by the term "about".

Component A: Polycarbonate The polycarbonate composition according to the present invention comprises 70-95 wt. % of aromatic polycarbonate as component A, relative to the total weight of the composition.

In the context of the invention, the term "polycarbonate" is understood to mean both homopolycarbonates and copolycarbonates. These polycarbonates may be linear or branched in the familiar manner.

One type of polycarbonate or a mixture of different types of polycarbonates may be used according to the invention.

The polycarbonates present in the compositions are produced in a known manner from dihydroxyaryl compounds, carbonic acid derivatives, optionally chain terminators and branching agents.

Particulars pertaining to the production of polycarbonates are disclosed in many patent documents spanning about the last 40 years. Reference is made here, for example, to Schnell, "Chemistry and Physics of Polycarbonates", Polymer Reviews, Volume 9, Interscience Publishers, New York, London, Sydney 1964, to D. Freitag, U. Grigo, P. R. Miller, H. Nouvertn6, BAYER AG, "Polycarbonates" in Encyclopedia of Polymer Science and Engineering, Volume 11, Second Edition, 1988, pages 648-718, and finally to U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117 to 299.

Aromatic polycarbonates are produced for example by reaction of dihydroxyaryl compounds with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents. Another possibility is production by way of a melt polymerization process via reaction of dihydroxyaryl compounds with, for example, diphenyl carbonate.

In the case of homopolycarbonates only one dihydroxyaryl compound is employed and in the case of copolycarbonates two or more dihydroxyaryl compounds are employed.

Examples of suitable carbonic acid derivatives include phosgene or diphenyl carbonate.

Suitable chain terminators that may be employed in the production of polycarbonates are monophenols. Suitable monophenols are for example phenol itself, alkylphenols such as cresols, p-tert-butylphenol, cumylphenol and mixtures thereof.

Suitable branching agents are the trifunctional or more than trifunctional compounds familiar in polycarbonate chemistry, in particular those having three or more than three phenolic OH groups.

Polycarbonates can be the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane and also homo- or copolycarbonates derived from the dihydroxyaryl compounds of formulae (I), (II) and (III)

(I)

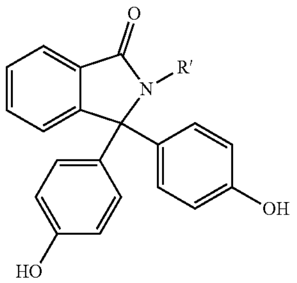

(II)

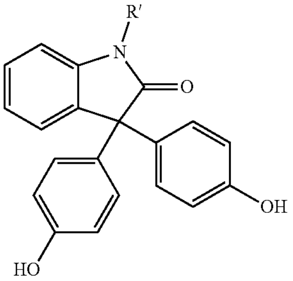

(III)

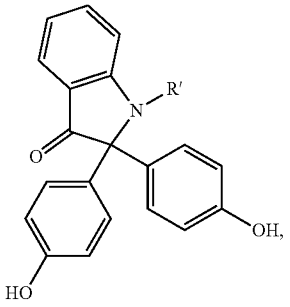

in which R' in each case is $C_1$- to $C_4$-alkyl, aralkyl or aryl, preferably methyl or phenyl, more preferably methyl.

Preferred polycarbonate is the homopolycarbonate based on bisphenol A.

For the purpose of incorporation of additives, component A employed is preferably in the form of powders, pellets or mixtures of powders and pellets.

In an embodiment, the polycarbonate composition comprises as component A a copolycarbonate comprising one or more monomer units of formula (1)

(1)

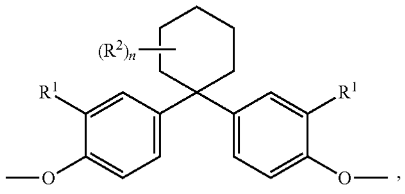

wherein $R^1$ is hydrogen or $C_1$- to $C_4$-alkyl radicals, preferably hydrogen, $R^2$ is $C_1$- to $C_4$-alkyl radicals, preferably a methyl radical, n is 0, 1, 2 or 3, preferably 3, optionally in combination with an additional aromatic homo- or copolycarbonate comprising one or more monomer units of general formula (2)

(2)

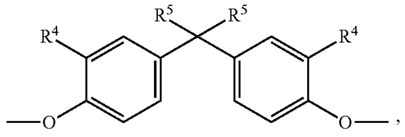

wherein $R^4$ is H, linear or branched $C_1$- to $C_{10}$-alkyl radicals, preferably linear or branched $C_1$- to $C_6$-alkyl radicals, more preferably linear or branched $C_1$- to $C_4$-alkyl radicals, most preferably H or a $C_1$-alkyl radical (methyl radical), and $R^5$ is linear or branched $C_1$- to $C_{10}$-alkyl radicals, preferably linear or branched $C_1$- to $C_6$-alkyl radicals, more preferably linear or branched $C_1$- to $C_4$-alkyl radicals, most preferably a $C_1$-alkyl radical (methyl radical);

wherein the additional homo- or copolycarbonate contains no monomer units of formula (1).

The monomer unit(s) of general formula (1) is/are introduced via one or more corresponding dihydroxyaryl compounds of general formula (1'):

(1')

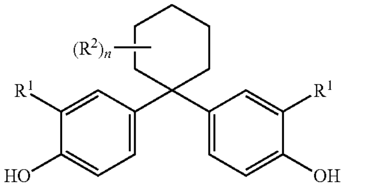

in which $R^1$ is hydrogen or a $C_1$- to $C_4$-alkyl radical, preferably hydrogen, $R^2$ is a $C_1$- to $C_4$-alkyl radical, preferably methyl radical, and n is 0, 1, 2 or 3, preferably 3.

The dihydroxyaryl compounds of the formula (1') and the use thereof in homopolycarbonates are disclosed in DE 3918406 A1 for example.

Another possible embodiment is given to 1,1-bis-(4-hydroxyphenyl)-3,3,5-trimethylcyclohexane (bisphenol TMC) having the formula (1a):

(1a)

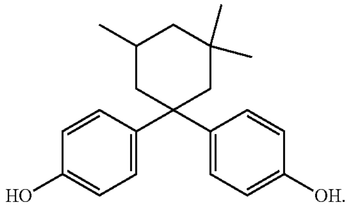

In addition to one or more monomer units of formula (1) the copolycarbonate may contain one or more monomer unit(s) of formula (3):

(3)

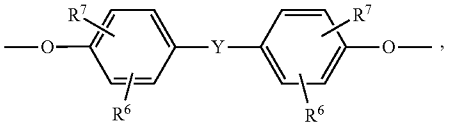

in which $R^6$ and R are independently H, $C_1$- to Cis-alkyl-, $C_1$- to Cis-alkoxy, halogen such as Cl or Br or optionally substituted aryl or aralkyl, preferably H, or $C_1$- to $C_{12}$-alkyl, more preferably H or $C_1$- to $C_8$-alkyl and most preferably H or methyl, and Y is a single bond, $-SO_2-$, —CO—, —O—, —S—, $C_1$- to $C_6$-alkylene, $C_2$- to $C_5$-alkylidene, or $C_6$- to $C_{12}$-arylene, which may optionally be fused with further heteroatom-comprising aromatic rings.

The monomer unit(s) of general formula (3) is/are introduced via one or more corresponding dihydroxyaryl compounds of general formula (3a):

(3a)

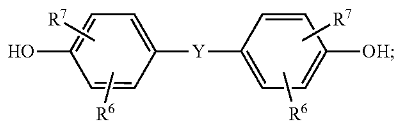

wherein $R^6$, $R^7$ and Y each has the meaning stated above in connection with formula (3).

Very particularly preferred dihydroxyaryl compounds of formula (3a) are dihydroxyaryl compounds of general formula (3b), (3b)

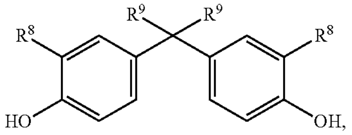

in which $R^8$ is H, linear or branched $C_1$- to $C_{10}$-alkyl radicals, preferably linear or branched $C_1$- to $C_6$-alkyl radicals, more preferably linear or branched $C_1$- to $C_4$-alkyl radicals, most preferably H or a $C_1$-alkyl radical (methyl radical), and in which $R^9$ is linear or branched $C_1$- to $C_{10}$-alkyl radicals, preferably linear or branched $C_1$- to $C_6$-alkyl radicals, more preferably linear or branched $C_1$- to $C_4$-alkyl radicals, most preferably a $C_1$-alkyl radical (methyl radical).

Dihydroxyaryl compound (3c) in particular is very particularly preferred herein.

(3c)

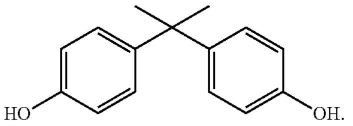

The dihydroxyaryl compounds of the general formula (3a) may be used either alone or else in admixture with one another. The dihydroxyaryl compounds are known from the literature or producible by literature methods (see for example H. J. Buysch et al., Ullmann's Encyclopedia of Industrial Chemistry, VCH, New York 1991, 5th Ed., Vol. 19, p. 348).

Copolycarbonates may be present in the form of block or random copolycarbonates. Random copolycarbonates are particularly preferred. The ratio of the frequency of the diphenoxide monomer units in the copolycarbonate is calculated from the molar ratio of the dihydroxyaryl compounds employed.

In addition to one or more monomer units of general formulae (2) the homo- or copolycarbonate which is optionally additionally present may contain one or more monomer units of formula (3) as previously described for the copolycarbonate.

Preferably, the aromatic polycarbonate is present in the polycarbonate composition in an amount ranging from 70.5-94 wt. %, more preferably from 71-93 wt. %, relative to the total weight of the polycarbonate composition.

Component B: Mineral Filler The polycarbonate composition according to the present invention comprises 4-26 wt. % of mineral filler as component B, relative to the total weight of the polycarbonate composition.

Examples of mineral filler are mica, talc, wollastonite, barium sulfate, silica, kaolin, titanium dioxide, aluminum hydroxide, magnesium hydroxide, feldspar, asbestos, calcium carbonate, dolomite, vermiculite, attapulgite, bentonite, perlite, pyrophylite or the like, or a combination comprising at least one of the foregoing mineral fillers.

Preferably, the mineral filler is selected from the group consisting of kaolin, talc, wollastonite, mica, and fused silica or a combination thereof.

Preferably, the mineral filler is present in the polycarbonate composition in an amount ranging from 5-24 wt. %, more preferably from 6-22 wt. %, even more preferably from 8-20 wt. %, relative to the total weight of the polycarbonate composition.

Component C: ester-modified wax The polycarbonate composition according to the present invention comprises 0.1-4 wt. % of ester-modified wax as component C, relative to the total weight of the polycarbonate composition.

The ester-modified wax used is a polyolefin grafted with ester groups represented by the following formula (W1):

(W1)

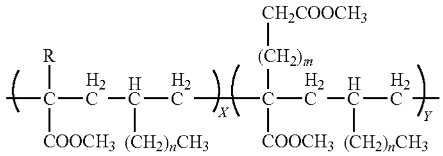

wherein

R is hydrogen or a $C_1$- to $C_5$-alkyl group, preferably hydrogen or a methyl group, n represents an integer of 20 to 40, m represents an integer of 1 to 5, preferably 1, and X and Y, independently of one another, represent an integer of 3 to 1000.

Preferably, in formula (W1),

R is hydrogen or a methyl group, n represents an integer of 20 to 40, m represents 1, and X and Y, independently of one another, represent an integer of 3 to 1000. More preferably, X and Y, independently of one another, represent an integer of 3 to 200.

In the formula (W1), m, n, Y and Y can be determined as specified in the examples section.

This ester-modified wax may be used alone or in combination with one or more other ester-modified waxes.

Preferably, this ester-modified wax is used as the only ester-modified wax, i.e. the polycarbonate composition does not contain other ester-modified wax not represented by the formula (W1).

Examples of the available ester-modified wax from the market are Ceralene 691, Ceralene 693 and Ceralene 694 from EuroCeras Sp. zo.o.

The introduction of Component C has a synergistic effect with other components in the polycarbonate composition and improves the impact strength, tensile elongation at break and surface gloss of the polycarbonate composition. Even in the absence of traditional impact modifiers, the impact strength of the polycarbonate composition according to this invention reaches a satisfying level.

Preferably, the ester-modified wax is present in the polycarbonate composition in an amount ranging from 0.2-3.5 wt. %, more preferably from 0.2-3 wt. %, even more preferably up to 2.5 wt. %, relative to the total weight of the polycarbonate composition.

Component D: Mold Release Agent

According to the first aspect, the polycarbonate composition according to the present invention comprises 0.1-0.6 wt. % of mold release agent, as component D, relative to the total weight of the polycarbonate composition.

Conventional industrial mold release agents can be used in the polycarbonate composition according to this invention. Examples of the mold release agent commonly used are pentaerythritol tetrastearate (PETS), glycerin monostearate (GMS), and stearyl stearate (Loxiol G32).

Other mold release agents available in market including montan wax, silicones and some ethylene copolymers, etc., can be also used in the polycarbonate composition according to the present invention.

Preferably, the mold release agent is present in the polycarbonate composition in an amount ranging from 0.2-0.6 wt. %, more preferably from 0.2-0.5 wt. %, relative to the total weight of the polycarbonate composition.

Component E: Antioxidant

The polycarbonate composition according to the present invention comprises 0.05-0.3 wt. % of antioxidant as component E, relative to the total weight of the polycarbonate composition.

The commonly used antioxidants include hindered phenol antioxidants, for example octadecyl-3,5-di-tert-butyl-4-hydroxyhydrocinnamate (Irganox 1076) and tetrakis[methylene-3-(3',5'-di-tert-butyl-4'-hydroxyphenyl)propionate] methane (Irganox 1010), and phosphite antioxidants, for example Tris(2,4-ditert-butylphenyl)phosphate (Irgafos 168). Hindered phenol antioxidants and phosphite antioxidants are often used simultaneously. In some embodiments, Irganox B900 is used, which is a mixture of Irgafos 168 and Irganox 1076 with a 4:1 ratio. Other applicable antioxidants include triphenyl phosphine (TPP), and Tetrakis(2,4-di-tert-butylphenyl)-4,4'-biphenyldiphosphonite (P-EPQ), etc.

Preferably, the antioxidant is present in the polycarbonate composition in an amount ranging from 0.08-0.2 wt. %, preferably from 0.1-0.2 wt. %, relative to the total weight of the polycarbonate composition.

Component F: Neutralizer

The polycarbonate composition according to the present invention may comprise 0-0.3 wt. % of neutralizer as component F, relative to the total weight of the polycarbonate composition.

For the purpose of the present invention, the neutralizer is added to neutralize the basicity of the mineral filler, if necessary.

The neutralizer contained in the polycarbonate composition according to the invention preferably is citric acid or phosphorous acid. For example, for neutralizing the basicity of talc, wollastonite, mica, and fused silica, citric acid can be used in the polycarbonate composition according to this invention.

Advantageously, the neutralizer is present in the polycarbonate composition in an amount ranging from 0.01-0.2 wt. %, preferably from 0.05-0.2 wt. %, relative to the total weight of the polycarbonate composition.

Component G: Coloring Agent The polycarbonate composition according to the present invention may comprise 0-2 wt. % of coloring agent as component G, relative to the total weight of the polycarbonate composition.

Coloring agents in the sense of the present invention are in particular inorganic pigments or organic coloring agents. Coloring agents preferably contained in the polycarbonate composition according to the invention are selected from the group consisting of carbon black, titanium dioxide, Heliogen Blue, Macrolex yellow, a combination thereof.

Preferably, the coloring agent is present in the polycarbonate composition in an amount ranging from 0.2-1.0 wt. %, more preferably from 0.4-0.6 wt. %, relative to the total weight of the polycarbonate composition.

Other Additives The polycarbonate composition may comprise one or more further conventional polymer additives, such as flame-retardant agents, hydrolytic stabilizers, UV stabilizers, antistatic agents.

The polycarbonate composition can further comprise 0-6 wt. % of an impact modifier, relative to the total weight of the polycarbonate composition. Suitable impact modifiers include butadiene or butadiene-styrene rubber-based core-shell impact modifiers, preferably, butadiene or butadiene-styrene rubber-based impact modifiers grafted with poly (methyl methacrylate) (PMMA) or MMA-styrene copolymer, e.g., Kane Ace M732 purchased from Kaneka, Paraloid EXL2650J, EXL2690, EXL2691J purchased from Dow Chemicals, etc.

Silicone-acrylic rubber based and silicone-rubber based impact modifiers are also preferred, for example Metablen SX-005 and Metablen S-2030 from Mitsubishi Chemicals. Other impact modifiers usually used in the industry can also be used.

Preferably, the polycarbonate composition according to the invention comprises the ester-modified wax as mentioned previously as the only impact modifier.

One preferred polycarbonate composition according to this invention consists of the following components:

A) 70-95 wt. % of aromatic polycarbonate,
B) 4-26 wt. % of mineral filler,
C) 0.1-4 wt. % of ester-modified wax,
D) 0.1-0.6 wt. % of mold release agent,
E) 0.05-0.3 wt. % of antioxidant,
F) 0-0.3 wt. % of neutralizer, and
G) 0-2 wt. % of coloring agent, wherein the amount of each component is based on the total weight of the polycarbonate composition, and the ester-modified wax has the following formula (W1):

(W1)

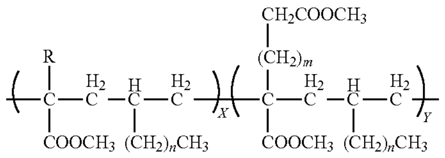

wherein

R is hydrogen or a $C_1$- to $C_5$-alkyl group, preferably hydrogen or a methyl group, n represents an integer of 20 to 40, m represents an integer of 1 to 5, preferably 1, and X and Y, independently of one another, represent an integer of 3 to 1000.

According to the second aspect, the present invention provides a process for preparing the polycarbonate composition according to the first aspect of the present invention, comprising the step of blending components A, B, C, D, E, and optional components F and G.

In particular, the process for preparing the polycarbonate composition according to the present invention comprises the step of blending a group of components comprising A) 70-95 wt. %, preferably 70.5-94 wt. %, more preferably 71-93 wt. % of aromatic polycarbonate,
B) 4-26 wt. %, preferably 5-25 wt. %, more preferably 6-25 wt. %, even more preferably 10-20 wt. % of mineral filler,
C) 0.1-4 wt. %, preferably 0.2-3.5 wt. %, more preferably 0.2-3 wt. %, even more preferably up to 2.5 wt. % of ester-modified wax,
D) 0.1-0.6 wt. %, preferably 0.2-0.6 wt. %, more preferably 0.2-0.5 wt. % of mold release agent,
E) 0.05-0.3 wt. %, preferably 0.08-0.2 wt. %, more preferably 0.1-0.2 wt. % of antioxidant,
F) 0-0.3 wt. %, preferably 0.01-0.2 wt. %, more preferably 0.05-0.2 wt. % of neutralizer, and
G) 0-2 wt. %, preferably 0.2-1.0 wt. %, more preferably 0.4-0.6 wt. % of coloring agent, wherein the amount of each component is based on the total weight of the polycarbonate composition, and the ester-modified wax has the following formula (W1):

(W1)

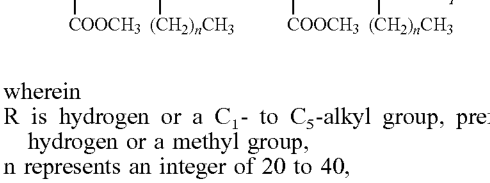

wherein

R is hydrogen or a $C_1$- to $C_5$-alkyl group, preferably hydrogen or a methyl group, n represents an integer of 20 to 40, m represents an integer of 1 to 5, preferably 1, and X and Y, independently of one another, represent an integer of 3 to 1000.

One preferred process for preparing the polycarbonate composition according to the present invention comprises the step of blending a group of components consisting of A) 70-95 wt. % of aromatic polycarbonate, B) 4-26 wt. % of mineral filler, C) 0.1-4 wt. % of ester-modified wax, D) 0.1-0.6 wt. % of mold release agent, E) 0.05-0.3 wt. % of antioxidant, F) 0-0.3 wt. % of neutralizer, and G) 0-2 wt. % of coloring agent, wherein the amount of each component is based on the total weight of the polycarbonate composition, and the ester-modified wax has the following formula (W1):

(W1)

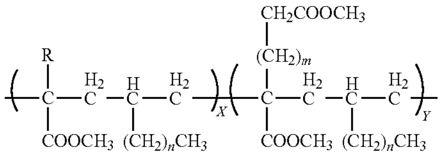

wherein

R is hydrogen or a $C_1$- to $C_5$-alkyl group, preferably hydrogen or a methyl group, n represents an integer of 20 to 40, m represents an integer of 1 to 5, preferably 1, and X and Y, independently of one another, represent an integer of 3 to 1000.

The step of blending the components in the process according to this invention can further comprise: 1) premixing components D-G to obtain a premix, and 2) blending the premix with components A-C to obtain a mixture, for example, in a twin-screw extruder. Subsequently, the process can further comprise a step of granulating the mixture to obtain granules.

According to the third aspect, the present invention provides a molded article made from a polycarbonate composition according to the first aspect of the present invention, such as, housings or parts of housings of electric and electronic devices, consumer appliances and automobile parts, in particular thin wall parts, for example, housings of laptops, wherein the wall thickness of the housing is less than 1.5 mm.

The polycarbonate composition, for example in the shape of granules, according to this invention can be molded in a mold to prepare the molded articles.

The molded articles made from the polycarbonate composition according to the invention have enhanced impact strength, tensile elongation at break and good surface gloss and are suitable for applications such as housings or parts of housings of electric and electronic devices, consumer appliances and automobile parts, for example, housings of laptops.

Thus, an electronic device with a housing or a part of a housing prepared with the polycarbonate composition according to the present invention also falls into the protection scope of the present invention.

According to the fourth aspect, the present invention provides a method for preparing the molded article mentioned above, comprising injection moulding, extrusion moulding, blowing moulding or thermoforming the polycarbonate composition according to the first aspect of the present invention.

During preparing molded articles with the polycarbonate composition according to this invention, the melting temperature for the molding process preferably is in the range of 280-350° C., more preferably 290-330° C., even more preferably 290-320° C. The mold temperature could be in the range of 70-100° C., preferably 75-90° C., more preferably 80-90° C., and the injection pressure can be in the range of 800-2600 bar, preferably 900-2500 bar and more preferably 1000-2400 bar.

EXAMPLES

With reference to the examples below, the present invention will be described in detail. These examples are only for the purpose of illustration, instead of intending to limit the scope of the present invention.

Raw Materials In Table 1, the raw materials used in the comparative examples and inventive examples are listed.

In the comparative examples ("CE") and inventive examples ("IE"), unless particularly indicated, the amount in percent of each component refers to the weight percent of the component relative to the resulting polycarbonate composition, with the total weight of the polycarbonate composition as being 100 wt. %.

Preparation of Molded Articles with Polycarbonate Compositions

In the following examples, the molded articles of a polycarbonate composition in the CEs and IEs listed in Tables 2-8 were prepared according to the following process:

1) premixing components D-G with a high-speed mixer to obtain a premix, the high-speed mixer used in CEs and IEs was Reimelt Henschel mixer with the model No. FML40.

2) blending the premix with component A-C in a twin-screw extruder to obtain a mixture and such mixture was granulated by extrusion to obtain granules, the twin-screw extruder used in the CEs and IEs was Coperion ZSK26.

3) injection moulding the granules into a molded article, the injection moulding machine used in CEs and IEs was Arburg 370S 700-170 S/N 215673, during preparing the testing samples with the polycarbonate composition, the melting temperature was 300° C., the mold temperature was 80° C., and the injection pressure was 1000 bar.

Testing Methods

The following properties were characterized.

1. MVR indicates the flowability property of the polycarbonate composition obtained and was measured under the conditions 260° C./5 kg according to ISO 1133-1:2011.
2. iMVR indicates the melt volume flow rate of the polycarbonate composition obtained and was measured by holding a testing sample under the condition of 260° C./5 kg for 15 minutes.
3. ΔMVR indicates thermal stability of the polycarbonate composition obtained and was calculated with the formula of (iMVR-MVR)/MVR*100%.
4. Tensile stress at break was measured according to ISO 527-2:2012.
5. Izod notched impact strength and unnotched impact strength were measured at the temperature of 23° C. according to ISO180/A:2000.

The testing samples for Izod notched impact strength were prepared with the injection molding process as mentioned above and had a dimension of 80 mm×10 mm×4 mm. The radius of notch was 0.25 mm. 10 testing samples were tested under each experimental condition and their average value was used as the impact strength value in tables in this application. The impact strength values were shown with the break type (C or P) in Tables. C stands for complete break and indicates the brittle behavior. P stands for partial break and indicates the partially ductile behavior. NB represents non-break, indicating fully ductile behavior.

6. Gloss indicates the degree to which the surface of an article is close to a mirror surface. The higher the numerical value, the closer the smoothness of the object surface is to the mirror surface.

Gloss was evaluated with BYK Hazegloss Meter according to ASTM D523-2014, wherein 20 and 60 degree angles were selected for illumination and detection signal. The unit of gloss is GU. The thickness of the testing samples is represented by h, and in the present application, it was 2 mm in the experiments.

7. Vicat softening temperature indicates the temperature at which a flat-ended needle penetrates the testing samples to the depth of 1 mm under a specific load. The temperature reflects the point of softening to be expected when a material is used in an elevated temperature application. A testing sample is placed in the testing apparatus so that the penetrating needle rests on its surface at least 1 mm from the edge. In comparative examples and inventive examples of this application, a load of 50N was applied to the testing samples. The testing samples were then lowered into an oil bath at 23° C. The bath was heated at a rate of 120° C. per hour until the needle penetrates 1 mm. In this application, Vicat soft temperature was measured in accordance with ISO 306: 2013.

$1196\ cm^{-1}$, $1164\ cm^{-1}$, and $827\ cm^{-1}$, the presence of long chain alkanes $(—CH_2—)_m$ was indicated through the peaks at $1465\ cm^{-1}$ and $719\ cm^{-1}$.

ii) The $^1H$ NMR spectrum of the sample was obtained at room temperature, with chloroform-d ($CDCl_3$) as the solvent used. In the $^1H$ NMR spectrum, the presence of methyl group (which is connected to O atom in polyacrylate) was indicated through the peak at 3.66 ppm, the presence of end groups ($—CH_3$) (which is connected to C atom in long chain alkanes) was indicated through the peak at 0.9 ppm. The mole ratio of $—OCH_3$ and $—CH_2CH_3$ was obtained from the 1H NMR spectrum. The mole ratio of $—OCH_3$ and $—CH_2CH_3$ was 1:1 for the wax used.

iv) The GCMS spectrum of the sample was obtained according to the equipment standard of Agilent: GC-7890A MS-5975c-2012, with chloroform ($CHCl_3$) as the solvent used. The numbers and type of monomer units were determined based on the mass spectrometry data obtained.

v) With Py-GCMS and manual pyrolysis GC-MS of the sample, the synthetic monomers could be determined and their total mass ratio was determined according to the area normalization method.

TABLE 1

Raw material used in comparative examples and inventive examples

| Component | Product Name | Description | Supplier |
|---|---|---|---|
| A-1 | | Polycarbonate based on bisphenol A with a weight-average molecular weight Mw of 24,500 g/mol | Covestro Polymers (China) |
| A-2 | | Polycarbonate based on bisphenol A with a weight-average molecular weight Mw of 20,500 g/mol | Company Limited |
| B-1 | Polyfil ® HG90 | Kaolin (Hydrous Aluminium Silicate) | KaMin LLC |
| B-2 | HTP Ultra 5C | Talc | IMI Fabi S.p.A. |
| B-3 | Wollastonite 4W 10992 | Wollastonite | Imerys Talc America, Inc. |
| B-4 | Mica W-600 | Mica | Lingshou Huajin Mica Co., LTD |
| B-5 | AMOSIL FW600 | Fused silica | Quarzwerke GmbH |
| C | Ceralene 694 | Polyolefin grafted with ester groups | EUROCERAS Sp. zo.o. |
| | Elvaloy ® AC1820 | Ethylene-methyl acrylate copolymer (EMA) with methyl acrylate content 20 wt. % and melt flow index 8 g/(10 min) (testing conditions 190° C., 2.16 kg, ISO 1133-1:2011) | Dupont |
| Impact modifier | ABS HRG P60 | ABS HRG (high rubber graft) with core-shell structure | INEOS Styrolution Group GmbH |
| D | PETS | Pentaerythritol tetrastearate as mold release agent | Guangzhou Nuochi |
| E | Irganox B 900 | Antioxidant | Ciba Specialty Chemicals |
| F | Citric acid | Neutralizer | Univar China Ltd. |
| G | BP800 | Carbon black as coloring agent | Cabot (China) Ltd. |

m, n, X and Y in the ester-modified wax according to formula (W1), which was used as component C, were determined via FTIR-spectroscopy, $^1H$ NMR-spectroscopy, GPC and GCMS as follows:

i) The FTIR spectrum of a sample was obtained at room temperature according to JY/T 001-1996. From the IR spectrum, the presence of polymethyl acrylate was indicated through the peaks at $1739\ cm^{-1}$, $1265\ cm^{-1}$, Element information was measured with an organic element analyzer PE SERIES II 2400 according to the general rule of element analyzer method: JY/T 017-1996. By this, the content of N, C and H could be determined.

The structural formula of the wax was formula W1, in which n represented an integer of 20 to 40, m represented an integer of 1 to 5, X and Y were in a range of 3-200.

TABLE 2

| Polycarbonate Composition | | | CE-1 | IE-1 | IE-2 | IE-3 | IE-4 | IE-5 | IE-6 | IE-7 | IE-8 | CE-2 |
|---|---|---|---|---|---|---|---|---|---|---|---|---|
| Component A-1 (PC) | | | 51.0 | 51.0 | 51.0 | 50.8 | 50.6 | 50.3 | 50.0 | 49.8 | 49.3 | 49.8 |
| Component A-2 (PC) | | | 33.0 | 32.8 | 32.6 | 32.6 | 32.4 | 32.2 | 32.0 | 31.7 | 31.7 | 31.7 |
| Component B-1 (kaolin) | | | 15.0 | 15.0 | 15.0 | 15.0 | 15.0 | 15.0 | 15.0 | 15.0 | 15.0 | 15.0 |
| Component C (ester-modified wax ) | | | | 0.2 | 0.4 | 0.6 | 1.0 | 1.5 | 2.0 | 2.5 | 3.0 | |
| Elvaloy ® AC1820 | | | | | | | | | | | | 2.5 |
| Component D (PETS) | | | 0.4 | 0.4 | 0.4 | 0.4 | 0.4 | 0.4 | 0.4 | 0.4 | 0.4 | 0.4 |
| Component E (Irganox B 900) | | | 0.1 | 0.1 | 0.1 | 0.1 | 0.1 | 0.1 | 0.1 | 0.1 | 0.1 | 0.1 |
| Component F (Citric acid) | | | | | | | | | | | | |
| Component G (carbon black) | | | 0.5 | 0.5 | 0.5 | 0.5 | 0.5 | 0.5 | 0.5 | 0.5 | 0.5 | 0.5 |
| Properties | Test conditions | Units | | | | | | | | | | |
| MVR | 260° C., 5 kg | $cm^3$/ (10 min) | 110 | 94.2 | 69.7 | 45.1 | 32.2 | 28.4 | 31.0 | 34.7 | 39.8 | 33.0 |
| iMVR | 260° C., 5 kg, 15 min | $cm^3$/ (10 min) | 138 | 110 | 77.0 | 53.0 | 37.6 | 29.5 | 30.6 | 33.7 | 40.0 | 33.6 |
| ΔMVR | 260° C., 5 kg | % | 25 | 17 | 10 | 18 | 17 | 4 | −1 | −3 | 1 | 2 |
| Tensile stress at break | 50 mm/min | MPa | 41.9 | 54.0 | 56.1 | 49.2 | 48.7 | 47.1 | 50.9 | 48.5 | 47.7 | 50.7 |
| Tensile strain at break | 50 mm/min | % | 1.3 | 2.0 | 8.2 | 15 | 27 | $1.1 \times 10^2$ | $1.1 \times 10^2$ | $1.0 \times 10^2$ | $1.0 \times 10^2$ | 8.4 |
| Izod notched impact strength | 23° C., 4 mm, 5.5 J | $kJ/m^2$ | 2.8C | 3.3C | 4.2C | 5.7C | 8.0C | 33P | 42P | 47P | 54P | 6.1C |
| Izod unnotched impact strength | 23° C., 4 mm, 5.5 J | $kJ/m^2$ | 49C | 55C | 76C | $1.4 \times 10^2$C | $2.0 \times 10^2$P/ NB | NB | NB | NB | NB | 56C |
| Gloss | h = 2 mm, 20° | GU | 36.1 | 42.3 | 46.5 | 46.6 | 46.9 | 64.3 | 70.3 | 74.6 | 81.1 | — |
| | h = 2 mm, 60° | GU | 74.5 | 80.1 | 82.0 | 82.0 | 82.5 | 91.9 | 93.9 | 95.5 | 96.7 | — |

In CE-1, no ester-modified wax was added, and correspondingly the AMVR of the testing samples in CE-1 was relatively high, i.e. 25%, which indicated that during blending of the components to prepare polycarbonate compositions, a serious degradation of polycarbonate happened, and this led to low impact strength of polycarbonate compositions.

In IE-1 to IE-8, the ester-modified wax was introduced, and the AMVR of the testing samples decreased to −3~18%. In IE-5 to IE-8, the decrease was much more substantially. This means that the addition of the ester-modified wax decreased the degradation of polycarbonate during the preparation of the polycarbonate compositions.

Meanwhile, when the content of the ester-modified wax increased from 0.2 wt. % to 3.0 wt. % in the IE-1 to IE-8, the tensile strain at break of the testing samples increased from 2% to 100%, with a maximum value of about 90 times of that in CE-1.

Further, as shown in IE-1 to IE-8, with the introduction of the ester-modified wax into the polycarbonate compositions, both the Izod notched impact strength and Izod unnotched impact strength were greatly improved. In IE-8, the Izod notched impact strength of the testing samples was about 20 times of that in CE-1.

In CE-2, Elvaloy® AC 1820 was added. As compared with IE-7, the tensile strain at break, impact strength of the sample obtained in CE-2 were much lower.

Table 2 also shows that the introduction of the ester-modified wax into the polycarbonate compositions had positive influence on the surface gloss of the testing samples. The surface gloss in inventive examples (IE-1 to IE-8) was improved monotonously.

TABLE 3

| Composition | | | CE-3 | IE-9 | IE-10 | IE-11 | IE-12 | CE-4 |
|---|---|---|---|---|---|---|---|---|
| Component A-1 (PC) | | | 51.0 | 51.0 | 50.8 | 50.6 | 49.9 | 50.6 |
| Component A-2 (PC) | | | 32.9 | 32.5 | 32.5 | 32.3 | 32.0 | 32.3 |
| Component B-2 (talc) | | | 15.0 | 15.0 | 15.0 | 15.0 | 15.0 | 15.0 |
| Component C (ester-modified wax) | | | | 0.4 | 0.6 | 1.0 | 2.0 | |
| Elvaloy ® AC1820 | | | | | | | | 1.0 |
| Component D (PETS) | | | 0.4 | 0.4 | 0.4 | 0.4 | 0.4 | 0.4 |
| Component E (Irganox B 900) | | | 0.1 | 0.1 | 0.1 | 0.1 | 0.1 | 0.1 |
| Component F (citric acid) | | | 0.1 | 0.1 | 0.1 | 0.1 | 0.1 | 0.1 |
| Component G (carbon black) | | | 0.5 | 0.5 | 0.5 | 0.5 | 0.5 | 0.5 |
| Properties | Test conditions | Units | | | | | | |
| MVR | 260° C., 5 kg | $cm^3$/10 min | 28.3 | 24.2 | 24.5 | 27.2 | 38.0 | 20.4 |
| iMVR | 260° C., 5 kg, 15 min | $cm^3$/10 min | 35.2 | 25.7 | 25.2 | 27.3 | 39.9 | 22.1 |
| ΔMVR | 260° C., 5 kg | % | 24.4 | 6.2 | 2.9 | 0.4 | 5.0 | 10 |
| Tensile strain at break | 50 mm/min | % | 8.1 | 16 | 22 | 63 | 65 | 8.4 |
| Izod notched impact strength | 23° C., 4 mm, 5.5 J | $kJ/m^2$ | 5.3C | 8.0C | 9.2C | 15C | 23P | 7.2C |
| Izod unnotched impact strength | 23° C., 4 mm, 5.5 J | $kJ/m^2$ | 89C | $1.6 \times 10^2$P | $1.9 \times 10^2$P | NB | NB | $1.0 \times 10^2$C |

TABLE 3-continued

| | | | | | | | | |
|---|---|---|---|---|---|---|---|---|
| Gloss | h = 2 mm, 20° | GU | 9.3 | 10.5 | 11.3 | 11.0 | 22.7 | — |
| | h = 2 mm, 60° | GU | 32.6 | 36.5 | 42.8 | 49.8 | 69.8 | — |

The mineral filler used in examples listed in Table 3 was talc.

As shown in Table 3, the testing samples in CE-3 had higher AMVR values as compared with that in IE-9 to IE-12. It indicates a much more serious degradation of polycarbonate happened in CE-3 than that in IE-9 to IE-12 during the preparation of the polycarbonate compositions.

When the content of the ester-modified wax increased to 2.0 wt. % in IE-12, the tensile strain at break of the testing samples increased to 65%, which was about 8 times of that in CE-3.

In CE-4, Elvaloy® AC1820 was added. As compared with IE-11, the tensile strain at break, impact strength of the sample obtained in CE-4 were much lower.

As shown in Table 3, in IE-9 to IE-12, both Izod notched impact strength and Izod unnotched impact strength were greatly improved with the introduction of the ester-modified wax as compared with that in CE-3. For example, in IE-12, with the introduction of 2 wt. % the ester-modified wax, the Izod notched impact strength of the testing samples was about 4 times of that in CE-3.

Table 3 also shows the influence of the ester-modified wax on the surface gloss of the molded articles. The surface gloss of the testing samples in IE-9 to IE-12 was improved with the addition of the ester-modified wax.

TABLE 4

| Composition | | | CE-5 | IE-13 | IE-14 | IE-15 | IE-16 | IE-17 |
|---|---|---|---|---|---|---|---|---|
| Component A-1 (PC) | | | 51.0 | 51.0 | 51.0 | 50.8 | 50.6 | 50.3 |
| Component A-2 (PC) | | | 32.9 | 32.7 | 32.5 | 32.5 | 32.3 | 32.1 |
| Component B-3 (Wollastonite) | | | 15.0 | 15.0 | 15.0 | 15.0 | 15.0 | 15.0 |
| Component C (ester-modified wax) | | | | 0.2 | 0.4 | 0.6 | 1.0 | 1.5 |
| Impact Modifier | | | | | | | | |
| Component D (PETS) | | | 0.4 | 0.4 | 0.4 | 0.4 | 0.4 | 0.4 |
| Component E (Irganox B 900) | | | 0.1 | 0.1 | 0.1 | 0.1 | 0.1 | 0.1 |
| Component F (citric acid) | | | 0.1 | 0.1 | 0.1 | 0.1 | 0.1 | 0.1 |
| Component G (carbon black) | | | 0.5 | 0.5 | 0.5 | 0.5 | 0.5 | 0.5 |
| **Properties** | **Test conditions** | **Units** | | | | | | |
| MVR | 260° C., 5 kg | $cm^3/10$ min | 36.3 | 24.8 | 27.8 | 29.6 | 50.4 | 68.4 |
| iMVR | 260° C., 5 kg, 15 min | $cm^3/10$ min | 38.9 | 25.4 | 27.0 | 29.9 | 42.8 | 62.3 |
| ΔMVR | 260° C., 5 kg | % | 7.2 | 2.4 | −2.9 | 1.0 | −15.1 | −8.9 |
| Tensile strain at break | 50 mm/min | % | 10 | 21 | 68 | 68 | 68 | 66 |
| Izod notched impact strength | 23° C., 4 mm, 5.5 J | $kJ/m^2$ | 5.5C | 7.9C | 9.3C | 9.9C | 11C | 12C |
| Izod unnotched impact strength | 23° C., 4 mm, 11 J | $kJ/m^2$ | 72C | NB | NB | NB | NB | NB |
| Gloss | h = 2 mm, 20° | GU | 5.7 | 8.0 | 7.9 | 9.4 | 14.6 | 14.0 |
| | h = 2 mm, 60° | GU | 19.9 | 26.2 | 29.9 | 35.6 | 50.8 | 47.7 |

The mineral filler used in examples listed in Table 4 was wollastonite.

Similarly with that shown in Table 2 and 3, these inventive examples in Table 4 show that the addition of the ester-modified wax reduced the degradation of polycarbonate during the preparation of polycarbonate compositions, improved the tensile strain at break, and improved the Izod notched and unnotched impact strength of the polycarbonate compositions. Moreover, the surface gloss of the polycarbonate compositions was also improved.

TABLE 5

| Composition | CE-6 | IE-18 | IE-19 | IE-20 | IE-21 |
|---|---|---|---|---|---|
| Component A-1 (PC) | 51.20 | 50.90 | 50.90 | 50.70 | 50.50 |
| Component A-2 (PC) | 32.70 | 32.80 | 32.60 | 32.60 | 32.40 |
| Component B-4 (mica) | 15.00 | 15.00 | 15.00 | 15.00 | 15.00 |
| Component C (ester-modified wax) | | 0.2 | 0.4 | 0.6 | 1.0 |
| Impact Modifier | | | | | |
| Component D (PETS) | 0.4 | 0.4 | 0.4 | 0.4 | 0.4 |
| Component E (Irganox B 900) | 0.1 | 0.1 | 0.1 | 0.1 | 0.1 |
| Component F (citric acid) | 0.1 | 0.1 | 0.1 | 0.1 | 0.1 |
| Component G (carbon black) | 0.5 | 0.5 | 0.5 | 0.5 | 0.5 |

TABLE 5-continued

| Properties | Test conditions | Units | | | | | |
|---|---|---|---|---|---|---|---|
| MVR | 260° C., 5 kg | $cm^3$/10 min | 37.6 | 30.0 | 28.1 | 29.4 | 32.7 |
| iMVR | 260° C., 5 kg, 15 min | $cm^3$/10 min | 42.7 | 33.5 | 29.7 | 28.5 | 33.9 |
| ΔMVR | 260° C., 5 kg | % | 13.6 | 11.7 | 5.7 | −3.1 | 3.7 |
| Tensile strain at break | 50 mm/min | % | 9.0 | 10 | 20 | 55 | 81 |
| Izod notched impact strength | 23° C., 4 mm, 5.5 J | kJ/$m^2$ | 4.8 C | 6.0 C | 7.4 C | 8.6 C | 15 C |
| Izod unnotched impact strength | 23° C., 4 mm, 11 J | kJ/$m^2$ | 70 C | 75 C | $1.4 \times 10^2$ P | NB(P) | NB |
| Gloss | h = 2 mm, 20° | GU | 4.8 | 5.9 | 6.5 | 6.5 | 10.0 |
| | h = 2 mm, 60° | GU | 22.8 | 27.9 | 30.0 | 30.5 | 45.1 |

The mineral filler used in examples listed in Table 5 was mica.

In Table 5, the inventive examples show that the addition of the ester-modified wax reduced the degradation of polycarbonate during the preparation of the polycarbonate compositions, improved the tensile strain at break, improved both the Izod notched impact strength and Izod unnotched impact strength. Also the surface gloss was improved with the addition of the ester-modified wax.

TABLE 6

| Composition | | | CE-7 | IE-22 | IE-23 | IE-24 |
|---|---|---|---|---|---|---|
| Component A-1 (PC) | | | 51.2 | 50.9 | 50.5 | 50.0 |
| Component A-2 (PC) | | | 32.7 | 32.6 | 32.4 | 32.4 |
| Component B-5 (fused silica) | | | 15.0 | 15.0 | 15.0 | 15.0 |
| Component C (ester-modified wax) | | | | 0.4 | 1.0 | 1.5 |
| Impact modifier | | | | | | |
| Component D (PETS) | | | 0.4 | 0.4 | 0.4 | 0.4 |
| Component E (Irganox B 900) | | | 0.1 | 0.1 | 0.1 | 0.1 |
| Component F (citric acid) | | | 0.1 | 0.1 | 0.1 | 0.1 |
| Component G (carbon black) | | | 0.5 | 0.5 | 0.5 | 0.5 |
| **Properties** | **Test conditions** | **Units** | | | | |
| MVR | 260° C., 5 kg | $cm^3$/10 min | 25.4 | 27.8 | 58.3 | 100 |
| iMVR | 260° C., 5 kg, 15 min | $cm^3$/10 min | 26.8 | 27.9 | 63.5 | 94.3 |
| ΔMVR | 260° C., 5 kg | % | 5.5 | 0.4 | 8.9 | −5.7 |
| Tensile strain at break | 50 mm/min | % | 18 | 75 | 78 | 79 |
| Izod notched impact strength | 23° C., 4 mm, 5.5 J | kJ/$m^2$ | 6.0 C | 13 C | 16 C | 14 C |
| Izod unnotched impact strength | 23° C., 4 mm, 11 J | kJ/$m^2$ | NB | NB | NB | NB |
| Gloss | h = 2 mm, 20° | GU | 8.3 | 11.2 | 29.7 | 31.0 |
| | h = 2 mm, 60° | GU | 39.4 | 45.7 | 68.7 | 66.6 |

In examples listed in Table 6, the mineral filler used was fused silica.

In IE-22 to IE-24, the inventive examples show that the addition of the ester-modified wax reduced the degradation of polycarbonate during the preparation of the polycarbonate compositions, improved the tensile strain at break, and improved both the Izod notched impact strength and Izod unnotched impact strength. Also the surface gloss was improved with the addition of the ester-modified wax.

TABLE 7

| Composition | CE-8 | CE-9 | CE-10 | IE-25 | CE-11 | CE-12 | IE-26 | CE-13 | CE-14 | CE-15 | IE-27 | CE-16 | CE-17 | IE-28 |
|---|---|---|---|---|---|---|---|---|---|---|---|---|---|---|
| Component A-1 (PC) | 99.5 | 94.0 | 88.0 | 91.5 | 89.0 | 83.0 | 86.5 | 47.3 | 79 | 73 | 76.5 | 74 | 68 | 71.5 |
| Component A-2 (PC) | | | | | | | | 30.7 | | | | | | |
| Component B-1 (kaolin) | | 5.0 | 5.0 | 5.0 | 10.0 | 10.0 | 10.0 | 15.0 | 20.0 | 20.0 | 20.0 | 25.0 | 25.0 | 25.0 |
| Component C (ester-modified wax) | | | | 2.5 | | | 2.5 | | | | 2.5 | | | 2.5 |
| Impact Modifier (ABS HRG) | | | 6 | | | 6 | | 6 | | 6 | | | 6 | |
| Component D (PETS) | 0.4 | 0.4 | 0.4 | 0.4 | 0.4 | 0.4 | 0.4 | 0.4 | 0.4 | 0.4 | 0.4 | 0.4 | 0.4 | 0.4 |

TABLE 7-continued

| | | | | | | | | | | | | | | | | |
|---|---|---|---|---|---|---|---|---|---|---|---|---|---|---|---|---|
| Component E (Irganox B 900) | | | 0.1 | 0.1 | 0.1 | 0.1 | 0.1 | 0.1 | 0.1 | 0.1 | 0.1 | 0.1 | 0.1 | 0.1 | 0.1 | 0.1 |
| Component F | | | | | | | | | | | | | | | | |
| Component G (carbon black) | | | | 0.5 | 0.5 | 0.5 | 0.5 | 0.5 | 0.5 | 0.5 | 0.5 | 0.5 | 0.5 | 0.5 | 0.5 | 0.5 |
| Properties | Test conditions | Units | | | | | | | | | | | | | | |
| MVR | 260° C., 5 kg | $cm^3$/ 10 min | 20.9 | 44.9 | 16.8 | 27.7 | 70.4 | 16.8 | 28.8 | 24.9 | 160.0 | 21.4 | 20.1 | 164.0 | 31.3 | 17.8 |
| iMVR | 260° C., 5 kg, 15 min | $cm^3$/ 10 min | 21.6 | 48.3 | 17.5 | 28.4 | 70.0 | 17.7 | 26.2 | 28.5 | 216.0 | 24.7 | 20.5 | 244.0 | 30.7 | 18.5 |
| ΔMVR | 260° C., 5 kg | % | 3.3 | 7.6 | 4.2 | 2.5 | −0.6 | 5.4 | −9.0 | 14 | 35.0 | 15.4 | 2.0 | 48.8 | −1.9 | 3.9 |
| Tensile strain at break | 50 mm/min | % | 100 | 84 | 94 | 110 | 19 | 73 | 110 | 17 | 0.6 | 12 | 110 | 0.6 | 1.8 | 87 |
| Izod notched impact strength | 23° C., 4 mm, 5.5 J | $kJ/m^2$ | 10C | 6.7C | 49P | 59P | 4.5C | 14C | 59P | 5.7C | 2.5C | 4.5C | 49P | 2.4C | 2.6C | 34P |
| Izod unnotched impact strength | 23° C., 4 mm, 11 J | $kJ/m^2$ | NB | NB | NB | NB | NB | NB | NE | 190C | 3.3C | 110C | NB | 2.6C | 29C | NB |
| Vicat softening temperature | 50N; 120 K/h | ° C. | 143 | 139 | 142 | 141 | 136 | 141 | 141 | 137 | 126 | 137 | 142 | 126 | 132 | 141 |
| Gloss | h = 2 mm, 20° | GU | — | 75.6 | 64.8 | 93.5 | 52.0 | 42.4 | 84.4 | 41.4 | 15.6 | 20.8 | 64.9 | 15.6 | 22.0 | 53.7 |
| | h = 2 mm, 60° | GU | — | 96.4 | 92.4 | 100 | 86.4 | 81.4 | 98.6 | 79.3 | 50.9 | 64.4 | 92.2 | 51.4 | 58.2 | 87.5 |

The used mineral fillers were kaolin and no ester-modified wax was added in these comparative examples in Table 7.

With 5 wt. % of kaolin and 2.5 wt. % of the ester-modified wax, the testing sample in IE-25 shows an improvement of 8 times of the notched impact strength as compared with that in CE-9. It was even higher than that in CE-10 with 6 wt. % of ABS HRG as the impact modifier.

Besides notched impact strength, the addition of the ester-modified wax shows further advantages over ABS HRG, for example, the testing sample in IE-25 exhibited much better surface gloss than those in CE-10.

CE-14 and CE-16 in Table 7 show higher AMVR as compared with that in the IE-25-28, which means that the addition of the ester-modified wax in the IE-25-28 reduced the degradation of polycarbonate.

Table 7 further shows that with a higher loading of kaolin (e.g., larger than 10 wt. %) and the ester-modified wax, the testing samples show much better performance than that testing samples in CE-15 and CE-17 in which ABS HRG was added as the impact modifier.

Moreover, the introduction of the ester-modified wax in the testing samples according to the invention, in particularly in IE-27 and IE-28, also brought higher Vicat soft temperature, as compared with the addition of ABS HRG.

TABLE 8

| Compositions | | | CE-18 | CE-19 | IE-29 | CE-20 | CE-21 | IE-30 | CE-22 | CE-23 | CE-24 | IE-31 | CE-25 | CE-26 | IE-32 |
|---|---|---|---|---|---|---|---|---|---|---|---|---|---|---|---|
| Component A-1 (PC) | | | 93.9 | 87.9 | 92.4 | 88.9 | 82.9 | 86.4 | 47.3 | 78.9 | 72.9 | 76.4 | 73.9 | 67.9 | 71.4 |
| Component A-2 (PC) | | | | | | | | | 30.6 | | | | | | |
| Component B-2 (talc) | | | 5.0 | 5.0 | 5.0 | 10.0 | 10.0 | 10.0 | 15.0 | 20.0 | 20.0 | 20.0 | 25.0 | 25.0 | 25.0 |
| Component C (ester-modified wax) | | | | | 1.5 | | | 2.5 | | | | 2.5 | | | 2.5 |
| Impact Modifier (ABS HRG) | | | | 6 | | | 6 | | 6 | | 6 | | | 6 | |
| Component D (PETS) | | | 0.4 | 0.4 | 0.4 | 0.4 | 0.4 | 0.4 | 0.4 | 0.4 | 0.4 | 0.4 | 0.4 | 0.4 | 0.4 |
| Component E (B900) | | | 0.1 | 0.1 | 0.1 | 0.1 | 0.1 | 0.1 | 0.1 | 0.1 | 0.1 | 0.1 | 0.1 | 0.1 | 0.1 |
| Component F (citric acid) | | | 0.1 | 0.1 | 0.1 | 0.1 | 0.1 | 0.1 | 0.1 | 0.1 | 0.1 | 0.1 | 0.1 | 0.1 | 0.1 |
| Component G (carbon black) | | | 0.5 | 0.5 | 0.5 | 0.5 | 0.5 | 0.5 | 0.5 | 0.5 | 0.5 | 0.5 | 0.5 | 0.5 | 0.5 |
| Properties | Test conditions | Units | | | | | | | | | | | | | |
| MVR | 260° C., 5 kg | $cm^3$/10 min | 24.1 | 15.4 | 29.9 | 46.3 | 13.6 | 20.8 | 15.6 | 160.0 | 11.5 | 20.2 | 244.0 | 12.7 | 16.5 |
| iMVR | 260° C., 5 kg, 15 min | $cm^3$/10 min | 28.5 | 15.3 | 31.8 | 64.6 | 13.8 | 24.4 | 16.5 | 272.0 | 13.4 | 19.3 | 395.0 | 13.2 | 17.4 |
| ΔMVR | 260° C., 5 kg | % | 18.3 | −0.6 | 6.4 | 39.5 | 1.5 | 17.3 | 5.8 | 70.0 | 14.5 | −4.5 | 61.9 | 3.9 | 5.5 |
| Tensile strain at break | 50 mm/min | % | 100 | 100 | 110 | 14 | 110 | 110 | 13 | 1.3 | 11 | 41 | 1.0 | 4.2 | 18 |
| Izod notched impact strength | 23° C., 4 mm, 5.5 J | $kJ/m^2$ | 7.0C | 37P | 29P/C | 5.8C | 15C | 48P | 7.3C | 2.7C | 6.9C | 45P | 2.8C | 5.2C | 36P |
| Izod unnotched impact strength | 23° C., 4 mm, 11 J | $kJ/m^2$ | NB | NB | NB | NB | NB | NB | 100P | 9.0C | 120P | NB | 4.6C | 60C | NB |
| Gloss | h = 2 mm, 20° | GU | 10.2 | 15.2 | 29.9 | 4.0 | 6.2 | 32.5 | 6.4 | 3.7 | 4.5 | 11.2 | 2.3 | 3.8 | 6.9 |
| | h = 2 mm, 60° | GU | 57.6 | 64.3 | 76.8 | 39.9 | 45.3 | 78.6 | 36.4 | 31 | 27.8 | 57.8 | 22 | 22.6 | 42.7 |

CE-18-26 had no ester-modified wax added. The used mineral fillers in examples in Table 8 were talc.

In IE-29, with 5 wt. % of talc and 1.5 wt. % of the ester-modified wax, the testing samples show improved notched impact strength by 4 times of that in CE-18.

In IE-31, with 10 wt. % of talc and 2.5 wt. % of the ester-modified wax, the testing samples show improved notched impact strength by 8 times of that in CE-20. It was even higher than that in CE-21, which had 6 wt. % of ABS HRG as the impact modifier.

Besides that, the testing samples in Table 8 show that the combination of the ester-modified wax with other components had the advantages of much higher MVR and surface gloss over the use of ABS HRG with other components in the comparative testing samples.

Table 8 shows that with a higher loading of talc (e.g., larger than 15 wt. %) and the introduction of the ester-modified wax, the testing samples in IE-31 and IE-32 show much better performance, such as longer tensile strain at break, higher Izod notched impact strength, and higher surface gloss, than the testing samples in CE-24 and CE-26 which used ABS HRG as the impact modifier.

The introduction of the ester-modified wax into the mineral filled polycarbonate compositions, in particular, the synergistic effect of the ester-modified wax, the mineral fillers and other components in the polycarbonate compositions, leads to the prominent improvement on properties such as impact strength, tensile elongation at break and surface gloss of the polycarbonate compositions. The polycarbonate compositions according to this invention even have better impact strength than that prepared with the addition of impact modifiers such as ABS HRG.

As shown in the inventive examples of this invention, the polycarbonate compositions with mineral fillers of kaolin or talc have surprisingly huge property improvement on the impact strength, tensile elongation at break and surface gloss. The polycarbonate compositions with wollastonite, mica or fused silica can also get pronounced improvement on the impact strength, tensile elongation at break and surface gloss.

The introduction of the ester-modified wax, in particular as a combination with other components and mineral fillers such as kaolin, can also improve Vicat soft temperature of polycarbonate compositions. Regarding the improvement of Vicat soft temperature, the inventive examples show that relative higher mineral filler loadings can be preferred in the polycarbonate compositions.

The inventive examples are only preferred examples of the present invention, being not employed to limit the invention. For those skilled in the art, various modifications and variations can be made to the compositions and processes of the present invention without departing from the scope of the invention. With reference to the disclosure in the present description, those skilled in the art may also reach other examples. The present description and examples should be only regarded as illustrative, and the true scope of the present invention is defined by the appended claims and their equivalents.

The invention claimed is:

1. A polycarbonate composition comprising the following components:

A) 70-95 wt. % of aromatic polycarbonate,

B) 4-26 wt. % of a mineral filler selected from the group consisting of kaolin, talc, mica, wollastonite, fused silica, and combinations thereof, C) 0.1-4 wt. % of ester-modified wax, D) 0.1-0.6 wt. % of mold release agent, E) 0.05-0.3 wt. % of antioxidant, F) 0-0.3 wt. % of neutralizer, and G) 0-2 wt. % of coloring agent, wherein the amount of each component is based on the total weight of the polycarbonate composition, and the ester-modified wax has the following formula (W1):

(W1)

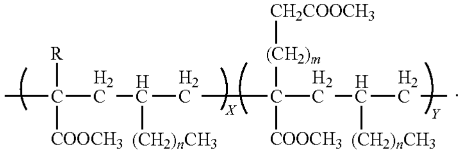

wherein

R is hydrogen or a $C_1$- to $C_5$-alkyl group, n represents an integer of 20 to 40, m represents an integer of 1 to 5, and X and Y, independently of one another, represent an integer of 3 to 1000.

2. The polycarbonate composition as claimed in claim 1, wherein in formula (W1), R is hydrogen or a methyl group, n represents an integer of 20 to 40, m represents 1.

3. The polycarbonate composition as claimed in claim 1, wherein the neutralizer is selected from citric acid or phosphorous acid.

4. The polycarbonate composition consisting of

A) 70-95 wt. % of aromatic polycarbonate,

B) 4-26 wt. % of mineral filler,

C) 0.1-4 wt. % of ester-modified wax,

D) 0.1-0.6 wt. % of mold release agent, and

E) 0.05-0.3 wt. % of antioxidant,

F) 0-0.3 wt. % of neutralizer, and

G) 0-2 wt. % of coloring agent, wherein the amount of each component is based on the total weight of the polycarbonate composition, and the ester-modified wax has the following formula (W1):

(W1)

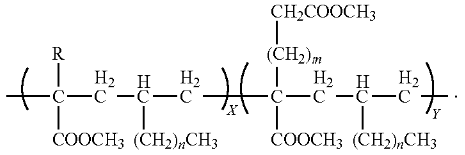

wherein

R is hydrogen or a $C_1$- to $C_5$-alkyl group, n represents an integer of 20 to 40, m represents an integer of 1 to 5, and X and Y, independently of one another, represent an integer of 3 to 1000.

5. The polycarbonate composition according to claim 1, wherein X and Y, independently of one another, represent an integer of 3 to 200.

6. A process for preparing the polycarbonate composition according to claim 1, comprising blending components A, B, C, D, E, and optionally components F and G.

7. The process as claimed in claim 6, wherein blending comprises:

premixing components D-G in a high speed mixer to obtain a premix, and blending the premix with components A-C to obtain a mixture.

8. The process for preparing a polycarbonate composition as claimed in claim 1, further comprising granulating the mixture to obtain granules.

9. A molded article made from the polycarbonate composition as claimed in claim 1.

10. A molded article according to claim 9, wherein the article is a housing or part of a housing of an electronic device, of a consumer appliance, or an automobile part.

11. A method for preparing the molded article according to claim 9 comprising injection moulding, extrusion moulding, blowing moulding or thermoforming the polycarbonate composition.

12. An electronic device with a housing or a part of a housing prepared with the polycarbonate composition as claimed in claim 1.

* * * * *